United States Patent [19]

Botwin et al.

[11] Patent Number: 4,490,719
[45] Date of Patent: Dec. 25, 1984

[54] POLARIZATION CONTROLLED MAP MATCHER MISSILE GUIDANCE SYSTEM

[75] Inventors: Leo Botwin, Westport; Lester H. Kosowsky, Stamford, both of Conn.

[73] Assignee: United Technologies Corporation, Hartford, Conn.

[21] Appl. No.: 325,520

[22] Filed: Nov. 27, 1981

[51] Int. Cl.³ .......................... G01S 13/06; F41G 7/20
[52] U.S. Cl. ............................. 343/5 MM; 343/7 ED
[58] Field of Search ..................... 343/5 MM, 7 ED

[56] References Cited

U.S. PATENT DOCUMENTS

| | | | |
|---|---|---|---|
| 2,994,080 | 7/1961 | Varela | 343/17.1 |
| 3,566,403 | 2/1971 | Hills | 343/5 |
| 3,943,512 | 3/1976 | Dempsey | 343/7.4 |
| 3,952,299 | 4/1976 | Hodge et al. | 343/5 MM |
| 4,008,472 | 2/1977 | Nirasawa et al. | 343/7 |
| 4,053,882 | 10/1977 | Van Etten | 343/5 |
| 4,107,678 | 8/1978 | Powell | 343/7 ED |
| 4,163,231 | 7/1979 | Zuerndorfer et al. | 343/5 |
| 4,179,693 | 12/1979 | Evans et al. | 343/5 MM |
| 4,204,210 | 5/1980 | Hose | 343/6 |
| 4,227,194 | 10/1980 | Herman et al. | 343/5 |
| 4,231,037 | 10/1980 | Long | 343/5 |

FOREIGN PATENT DOCUMENTS 50-77886  1/1977  Japan ........................................ 7/34

Primary Examiner—T. H. Tubbesing
Attorney, Agent, or Firm—Robert P. Sabath

[57] ABSTRACT

A reference grid for a map matching missile guidance system is generated from a vertically polarized radar map and a horizontally polarized radar map, both of which represent radar returns from a preselected ground area. In generating this reference grid, illuminating radar pulses are alternately fed to a horizontal aperture and vertical aperture of a mapping radar. Horizontal radar returns and vertical radar returns are processed in separate channels to form a radar map of the ground area containing the target to which the missile is to be directed. A pixel-by-pixel comparison of the data in each map is performed to create a polarization diverse map which is essentially those returns from man-made objects. This map is then used by the missile guidance system as a reference grid for a final fix by which the missile obtains its final course orientation enroute to the target.

1 Claim, 1 Drawing Figure

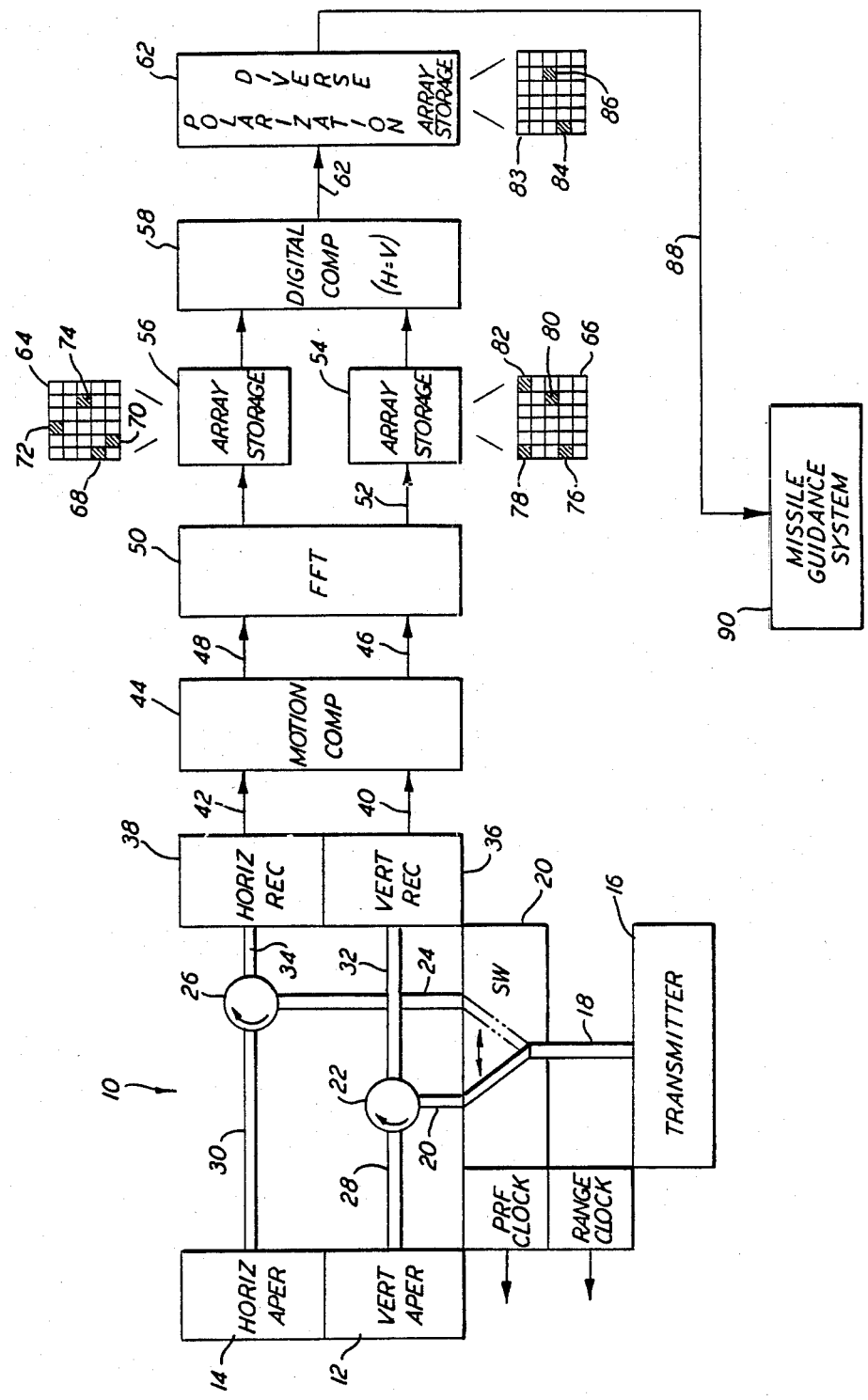

POLARIZATION CONTROLLED MAP MATCHER MISSILE GUIDANCE SYSTEM

DESCRIPTION

1. Technical Field

This invention relates to a missile reference grid guidance system, or the like, and more particularly to a missile guidance system of the type that includes a map matcher radar which utilizes the polarization of the radar returns as a discriminant to distinguish target from clutter, thereby simplifying the processing of radar returns in guiding the missile to its designated target.

2. Background of the Invention

Radar maps have been used as a part of a guidance system for a missile. Such guidance systems are known as "map matchers", and the missile has both its own radar sensor and a stored radar map on which the exact target of interest is identified. After the missile is launched, the onboard radar compares the returns received by the missile radar sensor against the radar map stored in the missile until a match is obtained. The control system in the missile can then direct the flight of the missile along a trajectory directly toward the target of interest. One such radar map guidance system is disclosed in U.S. Pat. No. 3,737,120 issued June 5, 1973 to E. Green for RADAR MAP COMPARISON GUIDANCE SYSTEM. The disclosed guidance system makes a series of maps of graduated resolution of the target area with the long distance, more sophisticated radar on the host aircraft. After the missile is launched, the missile then compares the returns from its radar sensor with the stored radar map by using certain strong returns until a fix is obtained. The missile flight path is then adjusted along a trajectory which directs the missile to the target.

Synthetic aperture radars (SAR) are generally known and are capable of providing a high resolution radar map of selected terrain. In fact, in some cases the resolution of a SAR map is so great that the map in fact has too much details for certain uses. One such use is a map matcher type guidance system for a missile where the points of interest are most often man-made objects which may, or may not, be capable of moving along the ground. Because these man-made objects are most likely the targets to which the missile is being directed, these objects also are the most suitable reference points for a fix by the guidance system of the missile and superfluous detail data only makes a fix more difficult.

The processing of radar returns in a surveillance radar is further complicated by the fact that the platform on which the radar antenna is mounted is an aircraft and the aircraft moves with respect to both the targets of interest and the clutter. Correction for this moving platform error is known as motion compensation and involves phase shifting the radar returns from both target and clutter by a predetermined frequency shift related to the movement of the aircraft. An internal navigation system, or similar device, is normally the reference source from which data is derived to measure the movement of the platform between illuminating pulses.

Many different processing techniques have been employed to distinguish targets from clutter. One such technique is known as doppler shift processing and involves utilizing the doppler shift of radar returns that appears as a change in the phase of the received signals between consecutive illuminating radar pulses. Still another method is known as displaced phase center processing and involves electronically displacing the aperture of the radar antenna along the flight path of the aircraft to align phase centers between sequential radar pulses. Briefly, this technique involves the transmission and reception of radar returns by the radar antenna and keeping track of the location and orientation of the antenna phase centers. A second illuminating pulse is then transmitted and the returns stored with the phase center of the radar antenna in a second known location. Since the phase centers of the first and second returns are separated by a precisely known distance related to the movement of the aircraft during the interpulse period, the phase centers can be electrically changed to coincide in time. Then, the radar returns from clutter, or nonmoving objects, will have no doppler shift leaving only the man-made targets, or movers with a doppler shift.

Once the target is identified, another technique known as interferometric processing involves the use of a multiaperture antenna so that the angle to a target can be identified by measuring the phase difference of received radar signals as they arrive at the multiaperture antenna.

A particular problem with utilizing doppler shift processing on certain targets is that targets may not necessarily be moving. If a target is not moving, such as a stationary vehicle, or is inherently nonmoving, such as a permanent gun emplacement, target identification by doppler shift processing alone is not very effective.

Clutter suppression by utilizing the polarization diversity processing of the radar returns is also known. U.S. Pat. No. 4,231,037 issued Oct. 28, 1980 to M. Long for RADAR CLUTTER SUPPRESSOR describes a target classifier that compares two or more video signals. The processing technique recognizes the fact that the ratio of horizontal returns to vertical returns fluctuate for targets and for clutter and that the ratio of these amplitudes varies more widely and more rapidly for clutter than it does for man-made targets.

Others have also recognized that the ratios between horizontal and vertical polarization of return varies between man-made objects such as land vehicles, and natural objects such as clutter. This phenomena is described in an article entitled "Target Discrimination Measurements At Millimeter Wavelengths" by A. Soong, L. Kosowsky and A. Green prepared for the 23rd Annual Triservice Radar Symposium dated July 15, 1977. FIG. 9, particularly, depicts the result of using polarization diversity to test and identify a land vehicle against a clutter background.

SUMMARY OF INVENTION

It is an object of the present invention to provide a map matcher type of missile guidance system which uses a H-V token, or polarization discriminant, to dramtically simplify the needed radar resolution and the onboard processing system of the guidance system in the missile in directing it to a target.

A particular feature of the H-V token map matcher missile guidance system of the present invention involves the use of a polarization discriminant to distinguish target from clutter and this creates a simple yet highly accurate grid reference system for directing the missile to a designated target.

Another feature of the H-V token controlled map matcher missile guidance system of the present invention is that the map matching portion of the missile is supplied with only those points of a radar map for which the amplitude of the horizontal return equals the amplitude of the vertical return.

According to the present invention a radar system includes two distinct channels connected to a horizontal aperture and a vertical aperture so that horizontal and vertical radar returns can be individually processed. Conventional motion compensation and fast Fourier transforms are performed on the radar returns in each channel to create a horizontal SAR map in one array storage unit and a vertical SAR map in another array storage unit. Data from selected areas of the two array storage units is compared on a pixel-by-pixel basis to derive a polarization diverse discriminant to identify those returns which have approximately the same ratios of intensity. This data is then fed into a third array storage unit and essentially identifies only man-made objects. This data is then fed to the map matching guidance system of a missile and is used to make a final correction of the missile enroute to its selected target.

The foregoing and other objects, features and advantages of the present invention will become more apparent from the following description of a preferred embodiment and accompanying drawing.

BRIEF DESCRIPTION OF DRAWING

The only FIGURE in the drawing depicts one embodiment, in block diagram form, of a technique for generating a polarization discriminant map.

BEST MODE FOR CARRYING OUT THE INVENTION

Referring to the sole FIGURE, there is seen one embodiment of a radar system utilizing a polarization discriminant which could be used in a map matcher type guidance system for a missile launched from a host aircraft. As mentioned, map matching type guidance systems for directing missiles to preidentified targets are generally known. Such a missile might be launched from a host aircraft which is located a substantial distance from the target to which the missile is being directed. The missile would typically include an onboard radar sensor and a control system which includes storage means for comparing the radar map generated by the missile radar sensor with the stored radar map. Once the missile control system fixes the inflight generated radar map with the stored radar map, the precise location of a target can be quickly identified and the missile control system directs the trajectory to the target.

A particular feature of the present invention involves the use of a polarization discriminant in a radar map that makes the map particularly well suited for use in a map matcher type missile guidance system. The radar system 10 on the aircraft includes a vertical aperture 12 and a horizontal aperture 14 which could be provided by an array antenna or the like. The transmitter 16 of the coherent type generates pulses of radar energy at its output on line 18. A switch 20 is transitioned on a pulse-by-pulse basis to direct the radar signals along either the waveguide 20 to the circulator 22 or the waveguide 24 to the circulator 26. The circulator 22 couples the transmit pulses to the waveguide 28 and the vertical aperture 12 of the radar antenna. In a similar fashion, the circulator 26 couples the transmit pulses to the waveguide 30 and the horizontal aperture 14 of the radar antenna.

The return radar signals received by the radar antenna are coupled via the vertical aperture 12 and the horizontal aperture 14 back to the circulators 22 and 26 where the radar returns are coupled to the waveguides 32 and 34 for presentation to the vertical receiver 36 and the horizontal receiver 38, respectively. As is known, each of the receivers typically converts the radar signals received at an RF frequency first to an IF frequency and then to a video signal. Normally, A/D converters would then translate the analog signals to digital signals for processing into SAR maps. For the purposes of simplicity, the complex nature of this processing scheme has been simplified and is illustrated in block diagram form in the drawing.

The digital signals from the vertical aperture 12 and the horizontal aperture 14 are then fed on the lines 40 and 42 to a motion compensation unit 44. An internal navigation system (not shown), or other similar system, on the radar platform provides reference signals indicating platform motion to the motion compensation unit 44. The incoming radar data on the lines 40 and 42 is then complex multiplied by a procedure generally known in the art and rotates the incoming radar data in any range bin by a vector signal that represents the platform motion with respect to the range bin of interest. This results in the compensation of the receive radar signals by correcting for the doppler frequency shift associated with the movement of the platform.

From the motion compensation unit 44 the data is presented on the lines 46 and 48 to a digital FFT processor 50. The digital FFT processor transforms the time history of the receive radar signals into a frequency domain representation of that data. In other words, at the output of the FFT processor there is the frequency characteristic for each range bin that is the format of a range doppler map of X range bins by Y doppler filters. The data corresponding to the vertically receive radar map is then presented on the line 52 to an array storage unit 54. In a similar fashion the radar returns received by the horizontal aperture 14 of the radar antenna are presented to an array storage unit 56.

A particular feature of the present invention is that the data stored in the array storage unit 54, i.e., the vertical radar returns, and the data stored in the array storage 56, i.e., the horizontal radar returns have a certain characteristic therebetween that can be used as a discriminant to identify man-made targets from clutter. This will probably be best understood by referring to the graphic portrayal of the horizontal SAR map 64 and the vertical SAR map 66 shown in the drawing. The horizontal SAR map 64 has a number of pixel areas 68, 70, 72 and 74 which have been identified as containing targets or man-made objects. In a similar fashion, the vertical SAR map 66 includes a number of pixel areas 76, 78, 80 and 82 which contain targets or man-made information. A polarization discriminant map 83 is then derived by simultaneously comparing the data on a pixel-by-pixel basis in the digital comparator 58. Because man-made objects have the characteristics that the ratio of the horizontal returns to the vertical returns is essentially constant intensity, only those returns which have this relationship will be passed on line 60 to the polarization diverse array storage unit 62. In other words, pixel 84 represents that pixel 76 in the vertical SAR map 66 and the pixel 68 in the horizontal SAR map 64 are of equal intensity and are colocated. Similarly, pixel 86 represents that pixel 80 in the vertical SAR map 66 and pixel 74 in the horizontal SAR map 64 are of equal intensity and colocated.

As mentioned, this array data would then be fed along the line 88 to the guidance system 90 on the missile. Because this data represents H-V tokens, or those points for which horizontal and vertical returns are of equal intensity, thre are many fewer such data points than would be contained in a comparable scene which included all of the clutter. The H-V token then form a simplified grid coordinant system of the preselected area and allows a more simplified processing technique in the map matching radar system to be employed. Once the radar returns received by the radar sensor of the missile obtain a fix against the stored data, the final corrective signals can be applied by the guidance system to direct the missile to its target.

Although this invention has been shown and described with respect to a preferred embodiment, it will be understood by those skilled in this art that various changes in form and detail thereof may be made without departing from the spirit and scope of the claimed invention.

I claim:

1. A method of providing a H-V reference grid for the guidance system of a missile, comprising the steps of:

providing a radar with horizontal aperture and a vertical aperture;

switching alternate illuminating pulses from the transmitter of said radar first to said horizontal aperture and then to said vertical aperture;

providing a separate receiver channel for horizontal radar returns and for vertical radar returns;

generating a horizontal map from said horizontal radar returns and a vertical map from said vertical radar returns, each of which has said radar returns organized in an array corresponding to various ground locations;

generating a polarization discriminant map by comparing on a pixel-by-pixel basis the location and intensity of radar returns in said vertical map with those in said horizontal map to identify only those returns which are colocated and have equal polarization intensity; and feeding the polarization discriminant to the guidance system of the missile.

* * * * *